United States Patent [19]

Davis et al.

[11] Patent Number: 4,604,672
[45] Date of Patent: Aug. 5, 1986

[54] APPARATUS AND METHOD FOR ENHANCING FLEXIBLE MAGNET DISK PERFORMANCE

[75] Inventors: C. Paul Davis, Woodland Hills; Eli Neuman, Chatsworth, both of Calif.

[73] Assignee: PerfectData Corporation, Chatsworth, Calif.

[21] Appl. No.: 499,189

[22] Filed: May 31, 1983

Related U.S. Application Data

[63] Continuation-in-part of Ser. No. 257,769, Apr. 27, 1981, abandoned.

[51] Int. Cl.$^4$ .......................................... G11B 23/00
[52] U.S. Cl. ................................. 360/137; 360/133; 360/128
[58] Field of Search ............... 360/128, 137, 98–99; 15/310, 311, 97 R

[56] References Cited

U.S. PATENT DOCUMENTS

| | | | |
|---|---|---|---|
| 2,987,955 | 6/1961 | Sassenberg | 15/100 X |
| 3,019,464 | 2/1962 | Grunwald et al. | 15/100 |
| 3,479,222 | 11/1969 | David et al. | 15/308 X |
| 4,107,810 | 8/1978 | Varni et al. | 360/137 X |
| 4,139,876 | 2/1979 | Owens | 360/97 |
| 4,177,491 | 12/1979 | Jahn | 360/133 |
| 4,211,580 | 7/1980 | Vowles | 360/137 X |
| 4,324,014 | 4/1982 | Stutz, Jr. et al. | 360/137 |

FOREIGN PATENT DOCUMENTS

| | | | |
|---|---|---|---|
| 2809292 | 9/1979 | Fed. Rep. of Germany | 360/72 |
| 54-134602 | 10/1979 | Japan | 360/72 |
| 55-67902 | 5/1980 | Japan | 360/72 |
| 2066997 | 7/1981 | United Kingdom | 360/72 |

Primary Examiner—John H. Wolff
Attorney, Agent, or Firm—Spensley Horn Jubas & Lubitz

[57] ABSTRACT

A method and system for treating a floppy disk with fluid is described. The system comprises a mechanism for grasping the floppy disk about its center and rotating it, fluid absorbing pads which are movable into and out of contact with the magnetic surfaces of the floppy disk through the read/write openings in the floppy disk envelope and a dispensing source for providing fluid to the pads. In a preferred embodiment, electrical signals control the sequence of operations whereby the floppy disk is grasped by a clutch and spindle mechansim and rotated, fluid is dispensed to the pads, and the pads are moved into contact with the surfaces of the floppy disk to treat the disk. Periodic treatment of a floppy disk with a fluid containing a lubricant enhances the reliability and increases the life of the floppy disk.

52 Claims, 15 Drawing Figures

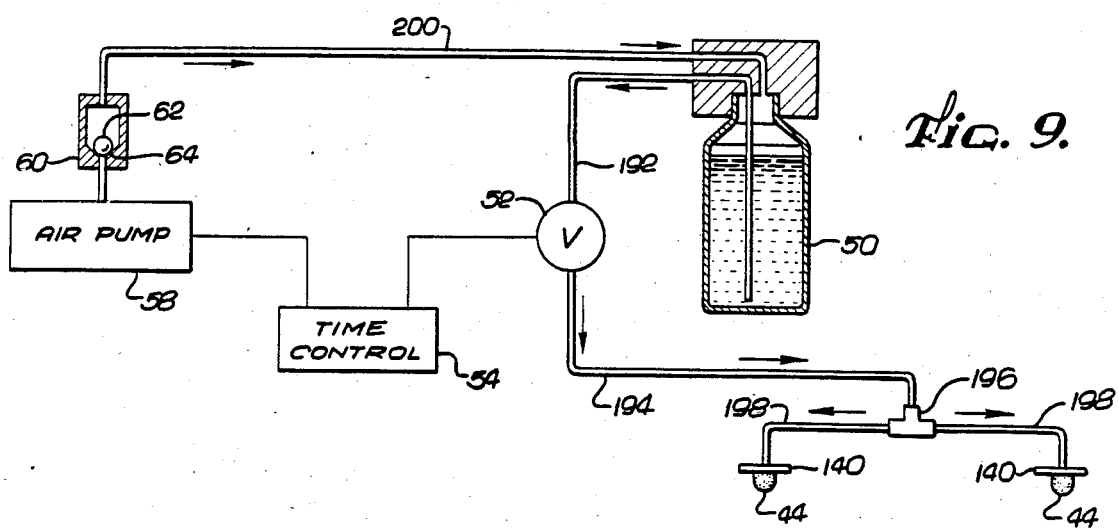
Fig. 9.
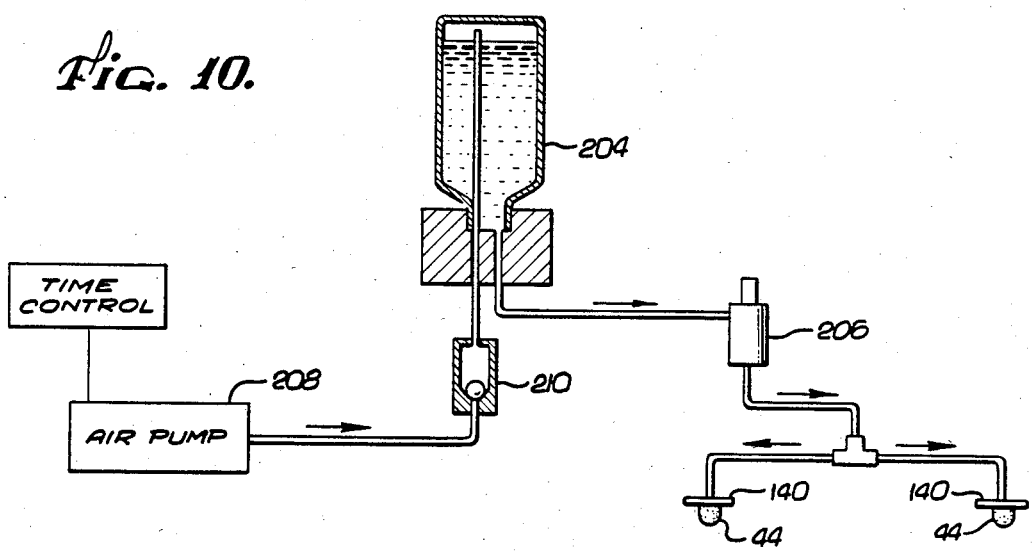
Fig. 10.
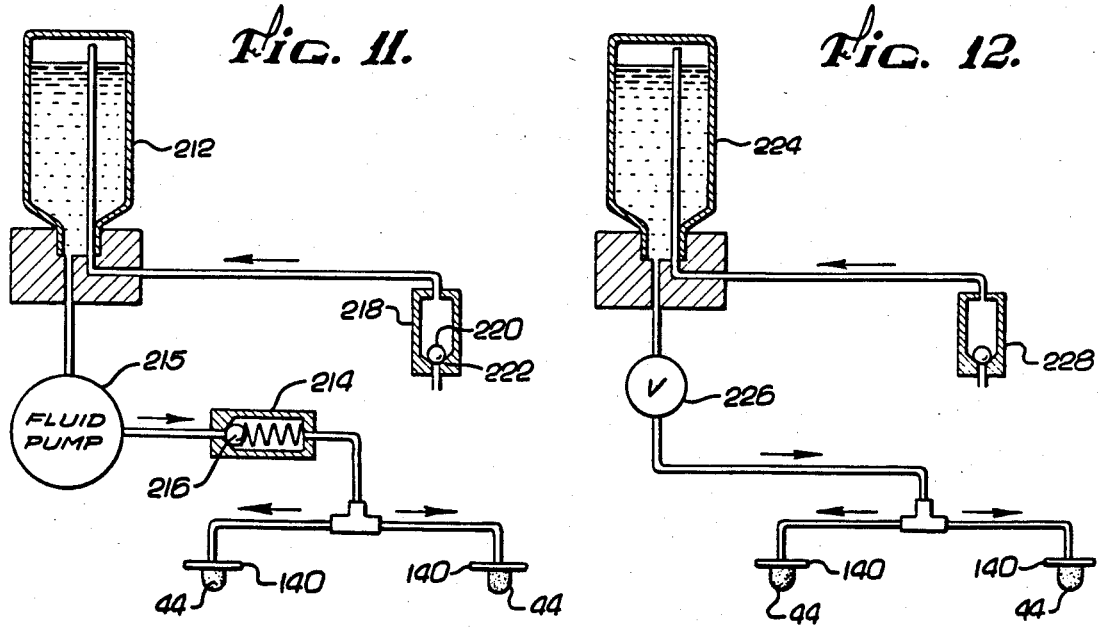
Fig. 11.
Fig. 12.

APPARATUS AND METHOD FOR ENHANCING FLEXIBLE MAGNET DISK PERFORMANCE

BACKGROUND OF THE INVENTION

1. Reference to Earlier Application

This application is a continuation in part of the application, Ser. No. 257,769 filed Apr. 27, 1981, now abandoned, by the same inventors.

2. Field of the Invention

This invention relates to the field of devices and methods for cleaning or conditioning rotating flexible magnetic information storage media of the type commonly known as floppy disks (or diskettes).

3. Prior Art

The push in today's technology of information storage is toward flexible magnetic disks having more and more storage capacity. The performance of the rotating flexible magnetic disks is, even today, however, often far from satisfactory due in large measure to the office environment in which the disks are used. Dust, oils, contaminants, oxide redeposits, and other airborne particulate matter settling on the disks often result in media failures. Floppy disks are also susceptible to contamination being deposited on their recording surfaces by operators and other people who handle the disks. Fingerprints are a major problem. In addition, the read/write and hub access openings in the floppy disk media jackets make it easy for oils, dust and other contaminants to be transferred from the environment to the recording surfaces. The problem is compounded by the fact that particulate matter is attracted and adheres to the disks due to static electricity. It will be appreciated that as the density of stored information on the disks becomes greater, failures due to contamination and other particulate matter become more and more serious. Hence, reliability is a crucial issue facing the manufacturers and users of the rotating flexible magnetic disk technology.

An additional problem is the wear experienced by the disks as a result of the read/write heads and the corresponding wear on the read/write heads themselves. These wear problems are caused by friction between the disks and the heads and by contaminants being transferred from the recording surfaces to the read/write heads themselves.

Until the present invention, the above problems of dust contamination, particle related failures and friction have not been adequately dealt with. One known device for allegedly cleaning the surfaces of flexible magnetic disks depends on the concept of scraping the surface of the disk with a sapphire scraper. In this device, a vacuum pump causes the flexible disk to be pressed against the sapphire scraper while simultaneously absorbing the dirt and oxide particles removed during the cleaning process. This occurs while the flexible disk is being rotated. The effectiveness of this prior art device in removing contamination from the surfaces of a flexible disk is not known. It should be noted, however, that it does not at all address the problem of the static electricity which causes dust and other particles to adhere to the surface of the disk nor does it address the need to lubricate the surfaces of the disk in order to reduce both media and read/write head wear.

In the present invention, on the other hand, all three problems are effectively addressed. In one operation, a rotating flexible magnetic disk may be cleaned, lubricated, and de-staticized within its envelope or jacket. A pad and conditioning fluid approach in which a soft absorbent pad is saturated with a highly volatile conditioning fluid is employed in the present invention. The read/write windows in the cardboard or plastic jacket which usually envelopes a rotating flexible magnetic disk is used to enable direct contact between the pads saturated with the conditioning fluid and the magnetic surfaces of the disk. In the present invention, the disk is grasped near its center and rotated while the pads are mounted on swinging mechanisms and are saturated with conditioning fluid, the excess conditioning fluid being allowed to drip off before the pads are swung into engagement with the surfaces of the magnetic disk to condition the disk. The high volatility of the conditioning fluid also helps to assure that excess fluid is not allowed to enter the flexible disk envelope and saturate the inner liner material of the envelope or otherwise collect within the floppy disk envelope.

An additional problem with flexible magnetic disks results from the tendency of some manufacturers to apply a layer of lubricant to the disk surfaces whose thickness exceeds the optimum level for most efficient performance. This has been done because, prior to the present invention, it was not possible or suggested that the user lubricate, clean or otherwise condition the disk. An undesirable effect of over-lubricating, it is found, is increased surface friction between the magnetic head and the disk surface. By treating the disk surface according to the present invention, this surface friction is reduced and flexible magnetic disk performance and life is enhanced.

The above-described approach of the present invention, while providing a simple and low-cost apparatus and method for not only cleaning, but lubricating and de-staticizing flexible magnetic disks, results in longer lasting and more reliable performance of both the hardware and the media. In reducing the media wear problem and in elimininating the down time resulting from dust contamination and airborne particulate matter related failures, the present invention in no small measure makes practical the ever higher and higher storage densities sought to be achieved in today's technology.

SUMMARY OF THE INVENTION

An object of the present invention is to provide an apparatus and process for cleaning, de-staticizing and lubricating flexible magnetic disks and thereby to enhance the reliability and to extend the usable life of such magnetic disks. To this end, the present invention has a mechanism for grasping the flexible magnetic disk near its central opening. This mechanism is coupled to an electrical motor which rotates the disk during the conditioning process. In the case of two-sided magnetic disks, the actual conditioning is performed by two foam pads saturated with conditioning fluid, one situated on each side of the flexible magnetic disk, each foam pad accessing the disk through the read/write openings in the envelope. The pads are mounted on arms which can be swung toward and away from the surfaces of the vertically mounted disk.

The conditioning fluid used to saturate the pads is supplied by a fluid dispensing system. In one embodiment, this system comprises an air pump which forces fluid from a reservoir through flexible tubing to a fitting on the back of the holders for the pads. During the fluid dispensing operation, the pads are held away from the flexible magnetic disk, so that they may be completely saturated with fluid, the excess fluid dripping away from the pads before the pads are brought into contact with the magnetic surfaces of the disk.

After the pads have been thoroughly saturated with cleaning fluid and the excess fluid has been allowed to drip off, the pads are swung into contact with the magnetic surfaces of the flexible disk while the flexible disk is slowly rotated. Thus the information storing surfaces are entirely treated with conditioning fluid by the pads.

It will be appreciated that the entire sequence of events in the conditioning process occurring after the flexible magnetic disk has been inserted into the apparatus is accomplished automatically. Timing signals activate the fluid dispensing system, cause the pads to be swung into and out of contact with the flexible magnetic disk and cause the flexible magnetic disk to begin rotation for a pre-set period of time. In the present invention, these timing signals originate in a control circuit or timing mechanism. Thus, all an operator need do is insert the flexible magnetic disk into the apparatus and initially activate it. After the conditioning procedure is completed, the dish may be removed and immediately put back into use. Because the disk has been treated with conditioning fluid which not only cleans but lubricates as well as destaticizes the magnetic surfaces of the disk, higher reliability and longer lasting operation are achieved.

The present invention can be used to condition floppy disks having information storing capability on one side only, since the envelopes or jackets for single sided disks are identical to those for double sided disks. Moreover, treating the non-used side of a single sided floppy disk is efficacious in that the contamination within the jacket which could either find its way to the information storing side of the disk or collect on the pressure pad disposed opposite to the magnetic head is removed.

The useful life of a floppy disk can be signficantly extended if it is treated with fluid on a regular basis according to the methods and with the apparatus described in the present invention, as such treatment results in a desirable level of lubrication on the disk significantly reducing wear. It has also been found that treatment of flexible magnetic disks prior to their first use according to the teachings of the present invention is desirable, as such treatment can result in removal of excess lubrication which is often placed on the surfaces of floppy disks by the manufacturers.

BRIEF DESCRIPTION OF THE DRAWINGS

FIG. 9 is a schematic of the fluid dispensing system used in the preferred embodiment.

FIG. 10 is a schematic of an alternate embodiment of a fluid dispensing system employing an air pump and gravity flow of fluid to the conditioning pads.

FIG. 11 is a schematic of a third alternate embodiment of a fluid dispensing system in which a fluid pump operates against a spring-loaded ball valve.

FIG. 12 is a schematic of a fourth alternate embodiment of a fluid dispensing system using gravity flow.

DESCRIPTION OF A PREFERRED EMBODIMENT OF THE PRESENT INVENTION

The apparatus of the preferred embodiment of the present invention described herein is especially useful for conditioning the surfaces of flexible rotatable magnetic disks, commonly referred to as floppy disks or diskettes.

Figure 1:
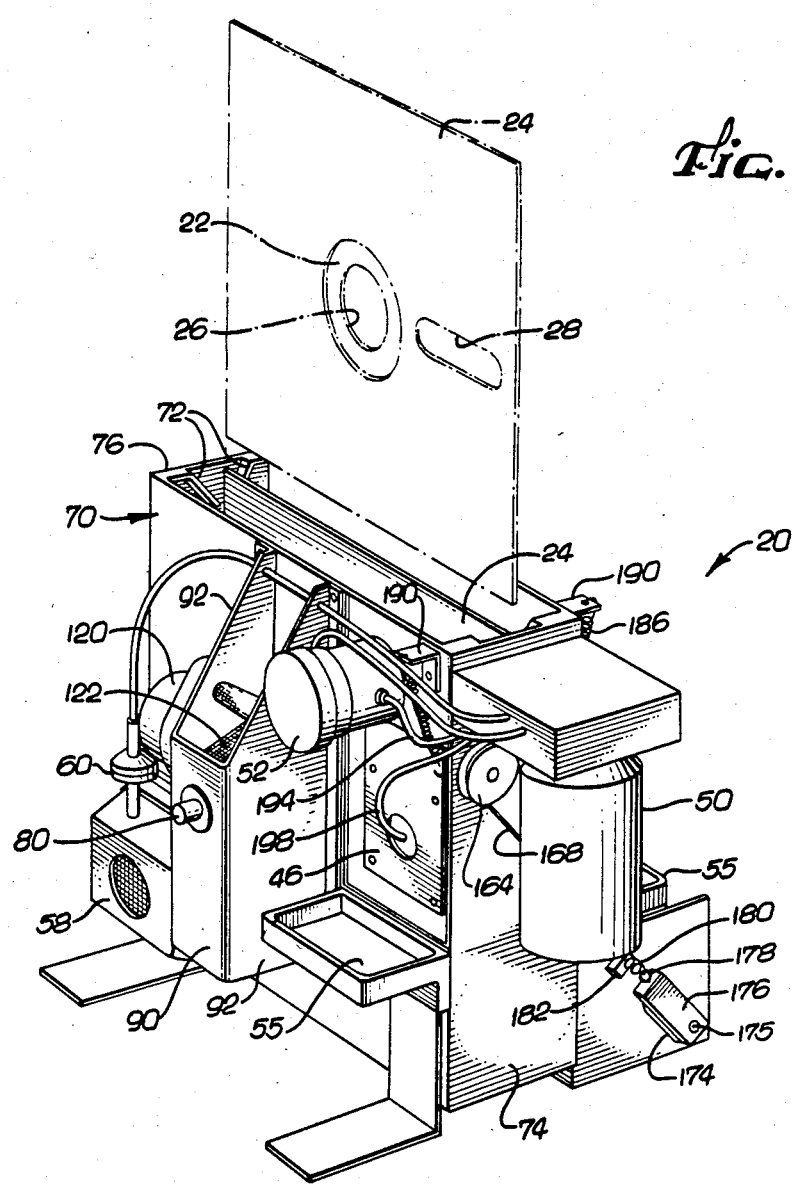
FIG. 1 is a perspective view of the preferred embodiment of the present invention with a flexible magnetic disk inserted therein. The flexible magnetic disk is also shown in phantom above the apparatus of the present invention before its insertion.

Referring first to FIG. 1, a perspective view of the apparatus 20 of the present invention is shown with a floppy disk 22 contained in an envelope or jacket 24 shown in detail above the apparatus 20. The floppy disk 22 is a very thin circular disk having one or both sides coated with a magnetic material for information storage. In order to facilitate the handling of the floppy disk 22 and to protect it, the floppy disk 22 is generally disposed within a thin stiffened jacket or envelope 24, which is typically made of stiff paper, cardboard, plastic or the like. Access to the magnetic surfaces of the disk 22 by read/write heads is provided by openings 28 in the envelope 24 of the floppy disk 22. Floppy disks having two magnetic information storing surfaces have read/write openings 28 directly opposite each other on the two sides of the envelope 24. In normal use, therefore, the envelope 24 is held at its edges so that it does not rotate while the floppy disk 22 is rotated. With the present invention, the floppy disk 22 is treated with conditioning fluid through the read/write openings 28 as it rotates, thereby allowing the entire read/write area of the disk to be cleaned, lubricated and destaticized.

As shown in FIG. 1, the floppy disk 22 is inserted into the apparatus 20 by sliding it in its envelope 24 vertically downward into the apparatus 20. The envelope 24 slips into guides 30 located on the front and back surfaces of the apparatus 20. The floppy disk envelope 24 is thereby properly positioned in the apparatus 20. Guides 30 may be seen more particularly in FIGS. 3 and 6.

Figure 6:
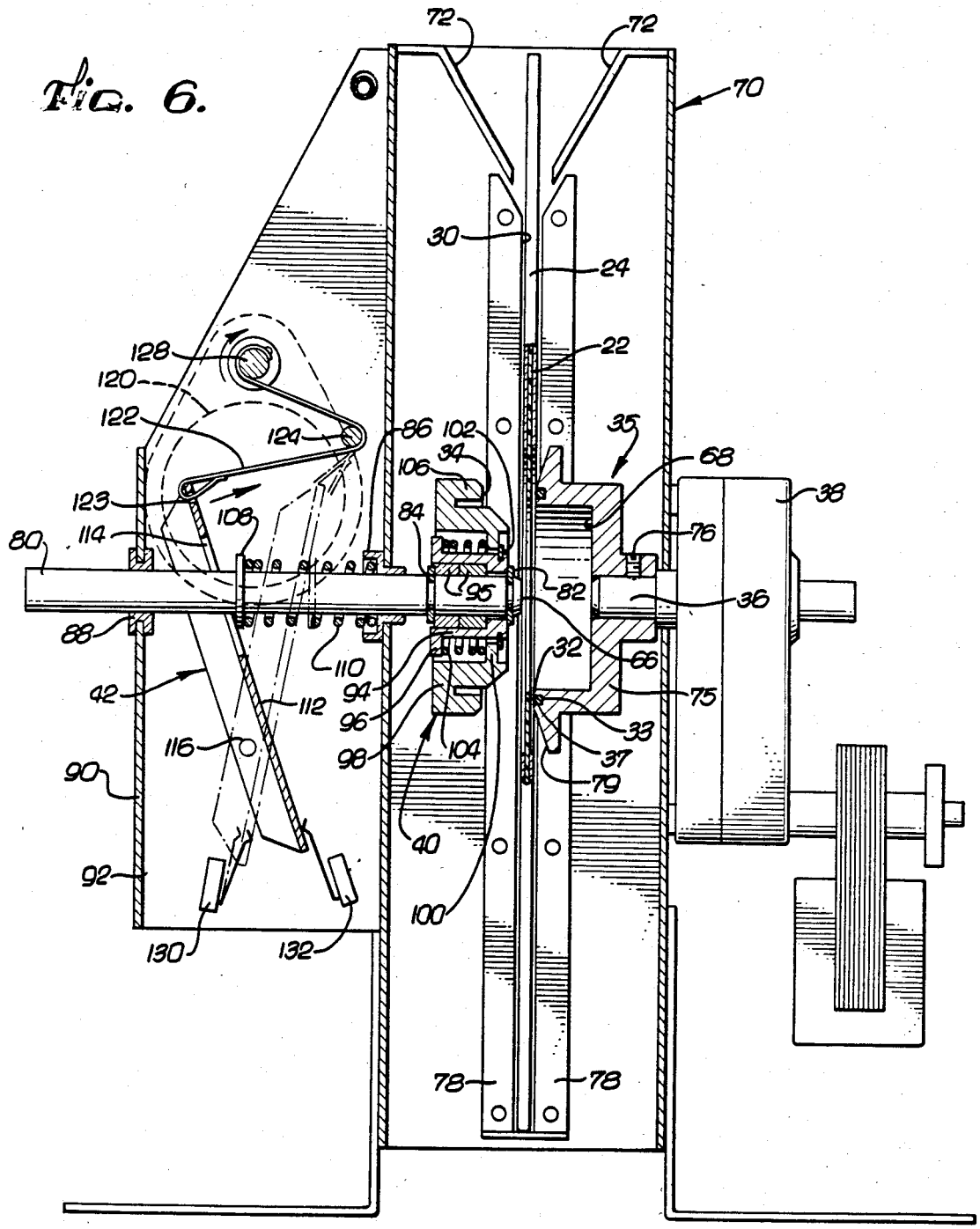
FIG. 6 is a cross-sectional view of the preferred embodiment of the present invention taken along the lines 6—6 in FIG. 2, particularly illustrating the clutch and spindle mechanisms and the clutch engaging and disengaging mechanism.
Figure 7:
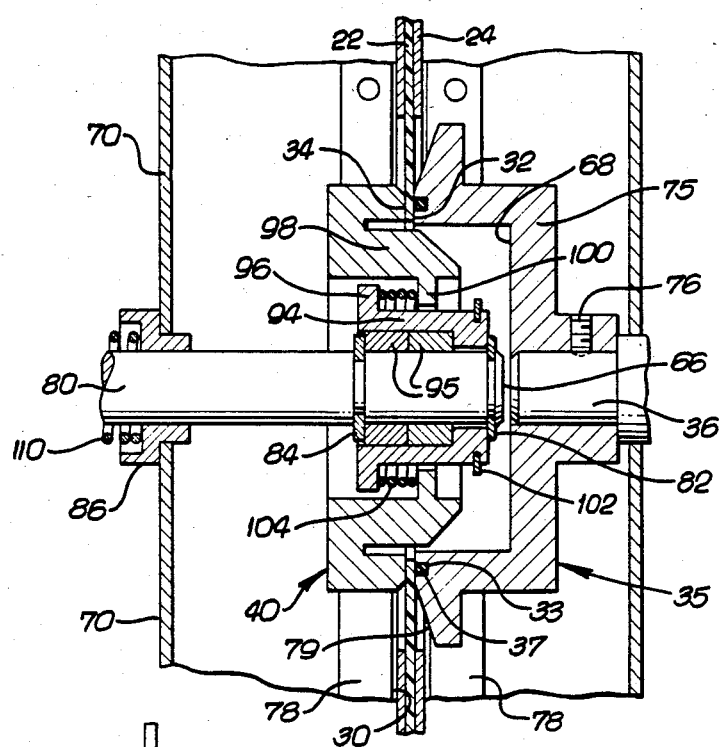
FIG. 7 is a detail of the clutch and spindle mechanisms shown in FIG. 6, but with the clutch and spindle mechanisms engaged.

The floppy disk 22 is grasped by the apparatus 20 in a region adjacent to its central opening 26 by means of facing annular surfaces 32 and 34, one of which contains an O-ring 37 which protrudes slightly from the surface. As seen in FIGS. 6 and 7, these surfaces 32 and 34 are respectively coupled to a spindle mechanism 35, which is rotated by an electric motor 38, and to a clutch mechanism 40 which engages the spindle mechanism 35 when the clutch engaging and disengaging mechanism 42 is activated. Through the cooperation of these components, floppy disk 22 may be rotated within its envelope 24, envelope 24 not being grasped by the surfaces 32 and 34 and therefore not being rotated with the floppy disk 22. Any tendency of envelope 24 to rotate with floppy disk 22 is prevented due to the square shape of envelope 24 and its placement between the guides 30 within the apparatus 20.

Figure 13:
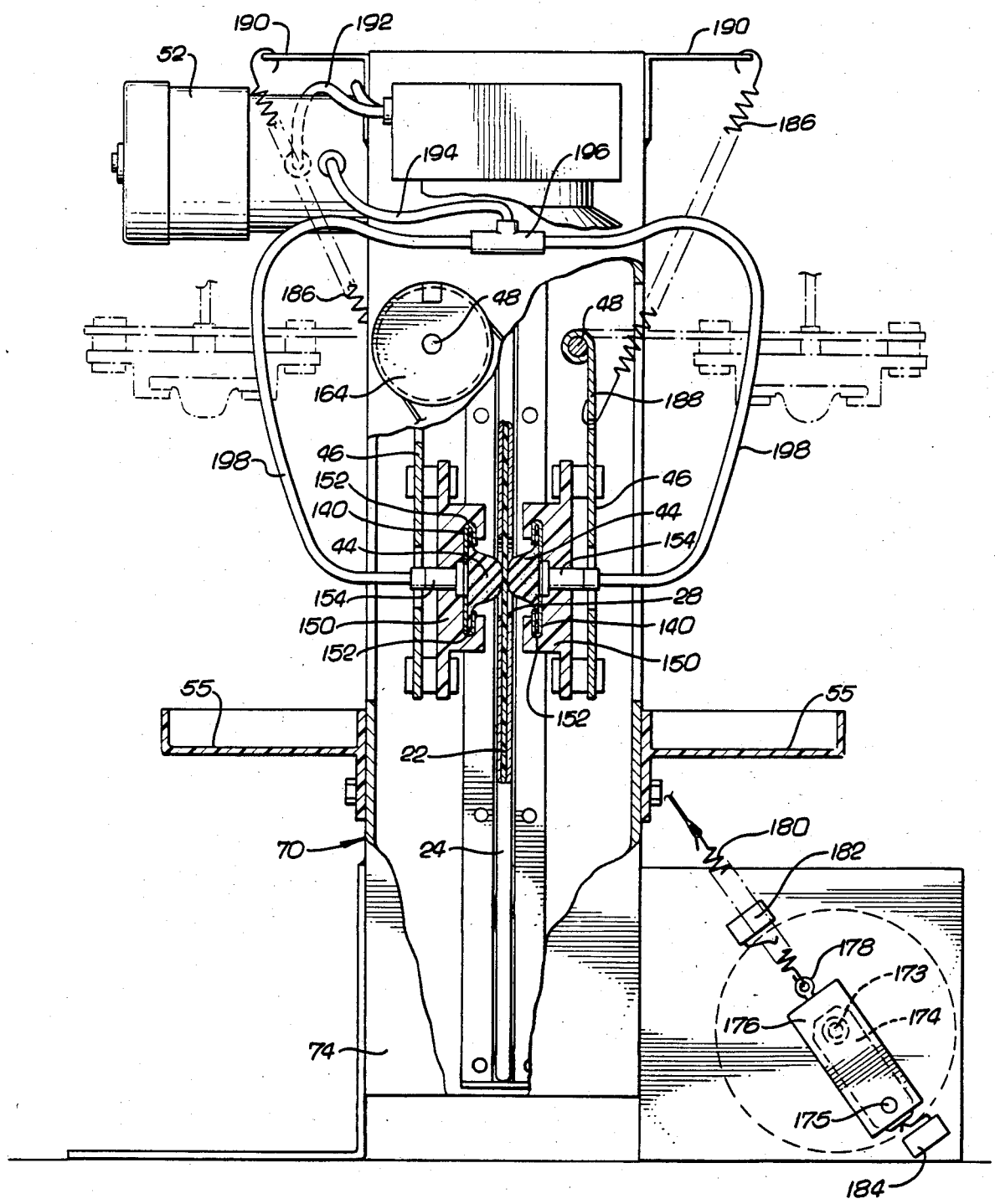
FIG. 13 is a partial cross-sectional view of the preferred embodiment of the present invention taken along the lines 13—13 of FIG. 2, particularly showing the conditioning pads and associated components used in swinging the conditioning pads toward and away from the surfaces of the flexible magnetic disk.

The approach taken by the present invention is to treat the magnetic surfaces of the floppy disk 22 by use of pads saturated with special conditioning fluid. For this reason, the fluid conditioning pads 44 and their associated components, as seen in FIG. 13, are situated so that the pads 44 contact the magnetic surfaces of the floppy disk 22 through the read/write openings 28, pads 44 spanning the entire width of the floppy disk 22 which is used for information storage. The pads 44 are coupled into pad swing plates 46 which pivot about axes 48 parallel to the nominal plane of the floppy disk 22. An arrangement of springs, pulleys and other components allow the swing plates 46 and thus the pads 44 to be swung toward or away from the magnetic surfaces of the floppy disk 22.

Figure 2:
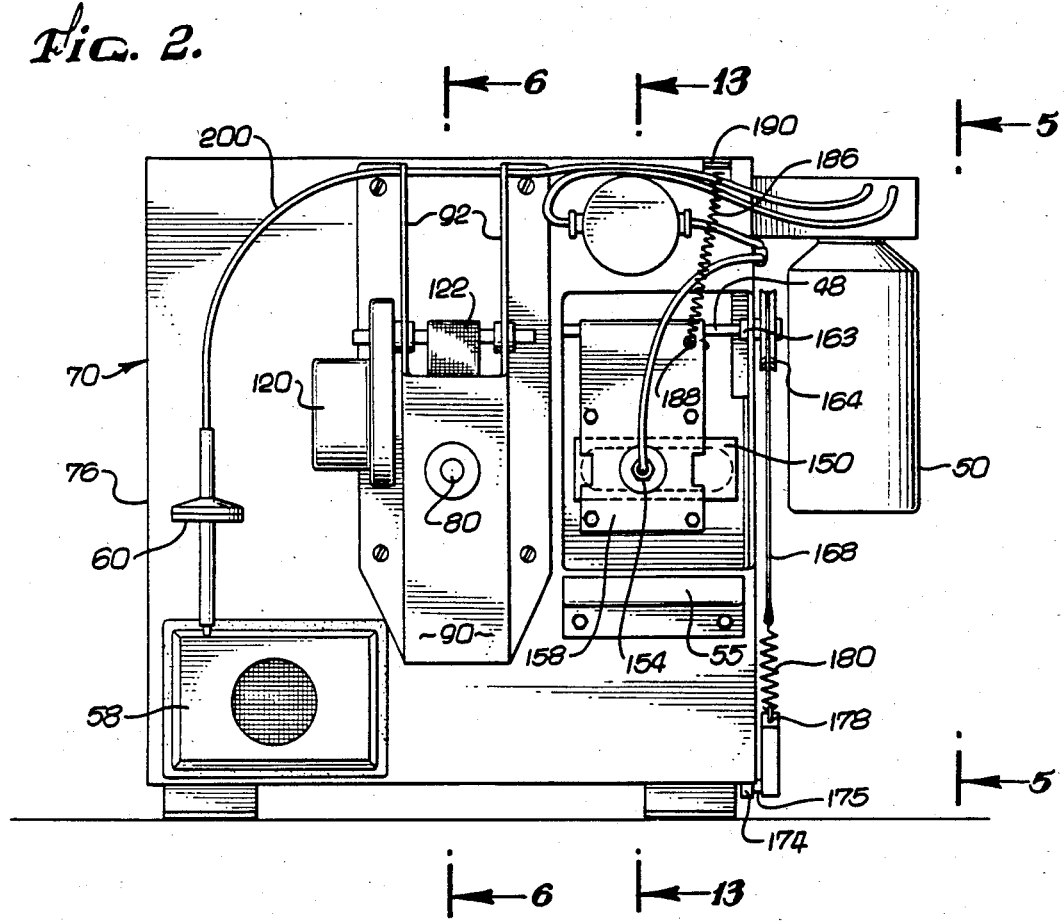
FIG. 2 is a side view of the preferred embodiment of the present invention.
Figure 3:
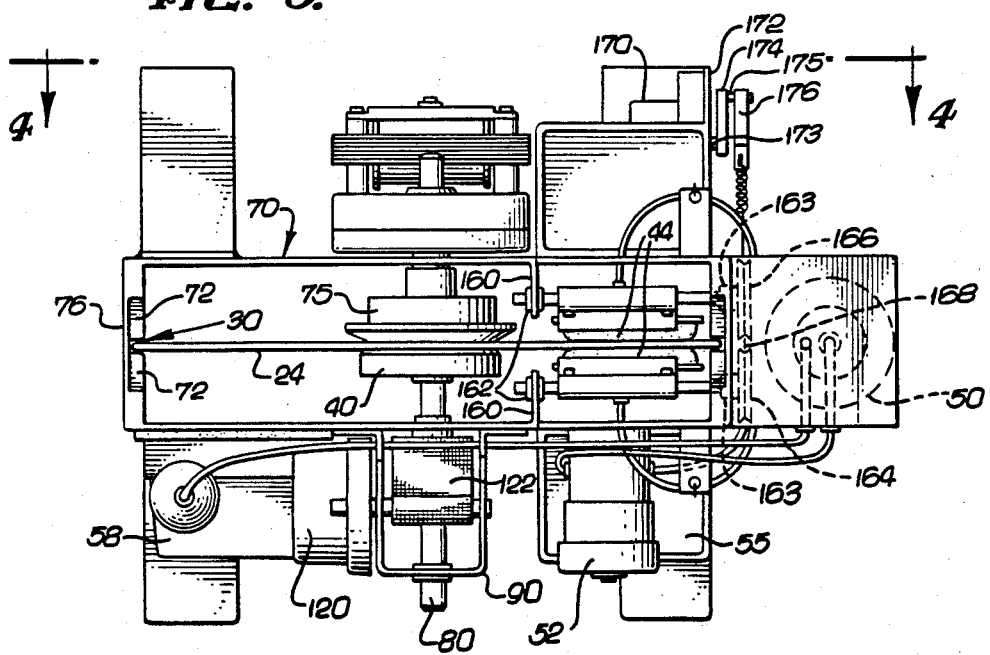
FIG. 3 is an overhead view of the preferred embodiment of the present invention with a flexible maqnetic disk inserted therein and the conditioning pads positioned against the disk.

The major components of the dispensing system for the conditioning fluid can be seen in FIGS. 1 through 3 and are shown schematically in FIG. 9. The conditioning fluid is contained in a reservoir or bottle 50. Simultaneously with the starting of air pump 58, solenoid valve 52 is opened allowing air pump 58 to pump air into the reservoir 50 and force the conditioning fluid from the reservoir 50 through flexible tubing to the rear of the pads 44. An electrical signal from a timing control mechanism 54, shown schematically in FIG. 9, controls the duration of the fluid pumping operation so that the pads 44 may be thoroughly saturated with conditioning fluid. This saturation of the pads 44 occurs when they are held away from contact with the magnetic surfaces of the floppy disk, as is shown in phantom in FIG. 13. Any excess fluid, therefore, is allowed to drip into trays 55 where it is allowed to evaporate. When the air pump 58 ceases operation, the ball valve 60 is seated, and the solenoid valve 52 is closed, thereby stopping the flow of fluid to the pads and preventing the evaporation of the highly volatile conditioning fluid.

After the floppy disk 22 and its envelope 24 have been inserted into the apparatus 20, the clutch engaging and disengaging mechanism 42, shown in FIG. 6, is activated so that the floppy disk 22 is grasped by the surfaces 32 and 34 and the clutch mechanism 40 engages the spindle wheel mechanism 35. Activation of the clutch engaging and disengaging mechanism 42 also triggers a limit switch 130, causing an electrical signal which starts the air pump 58 and opens the solenoid value 52 so that conditioning fluid is applied to the pads 44.

A timing signal starts the electric motor 38, causing the spindle 36 and hence the floppy disc 22 to rotate. At a predetermined time after the pads 44 have been saturated with the conditioning fluid and the excess fluid has been allowed to drip from the pads 44 into the trays 55, and after the disk 22 has begun rotating, the mechanisms which swing the pads 44 into contact with the magnetic surfaces of the floppy disk 22 are automatically activated. The rotation of the floppy disk 22 allows the cleaning pads 44 to be swept over the entire magnetic recording surface area of the floppy disk 22, thereby treating that entire area with conditioning fluid. After a predetermined period of time, electrical signals cause the pads 44 to swing away from the magnetic surfaces of the floppy disk. Other signals thereafter stop the rotation and disengage the clutch and spindle mechanisms. The conditioning procedure is now complete. The floppy disk 22 may be removed from the apparatus 20. The above-described procedure has resulted in the floppy disk 22 not only being cleaned but lubricated and destaticized as well.

The particular structure and components of a preferred embodiment of the present invention will now be described in more detail with respect to the figures. The conditioning process on a floppy disk 22 is begun by inserting the floppy disk 22 in its envelope 24 into the main compartment 70 of the apparatus 20. Main compartment 70 is sized to accommodate a floppy disc inserted vertically. To assist in the proper positioning of the floppy disc 22 in the main compartment 70, inwardly slanting guiding surfaces 72, shown in FIGS. 1 and 6, are located near the top of the main compartment 70 at its front side 74 and its rear side 76. These guiding surfaces 72 assist in directing the disk envelope 24 between the guides 30, one of which is positioned vertically on the inside of the front side 74 and the other of which is positioned vertically on the inside of the rear side 76 of the main compartment 70. In the preferred embodiment, each guide 30 is comprised of a narrowly separated pair of aluminum bars 78 vertically positioned and attached by fasteners to the front side 74 or the back side 76 of the main compartment 70. The spacing between the bars 78 for each guide 30 permits the envelope 24 of a floppy disk 22 to be slid downward between the bars 78 but does not permit very much lateral movement of the envelope 24. Thus the guides 30 serve to correctly position the floppy disk 22 within the main compartment 70 for the conditioning process. It is essential that the floppy disk 22 in its envelope 24 be inserted into the main compartment 70 with its read/write openings 28 located as shown in FIG. 1. Only with the envelope 24 of the floppy disk 22 so oriented will the pads 44 have access to the floppy disk 22 for the conditioning procedure.

The floppy disk 22 must be rotated in order that the cleaning pads 44 disposed at the read/write openings 28 of the floppy disk envelope 24 have access to the entire magnetic information storing surfaces of the floppy disk 22. In order to rotate the floppy disk 22, a rod or spindle 36 is coupled to an electric motor 38 attached to the side of main compartment 70. The spindle 36 protrudes through the main compartment 70 and the axis about which it rotates is perpendicular to the nominal plane of a floppy disk 22 inserted properly into the main compartment 70 between the guides 30. This axis passes through the center of the opening 26 in the floppy disk 22. However, the spindle 36 does not itself penetrate the nominal plane of the floppy disk 22. Preferably, electric motor 38 rotates floppy disk 22 at a speed which permits conditioning fluid to substantially evaporate from the surface of the floppy disk 22 leaving only lubricant, before that portion of the surface is rotated beneath the floppy disk envelope.

A cup shaped spindle wheel 75 having a circular opening through its center of approximately the diameter of the spindle 36 is placed concentrically about spindle 36 and is attached to it by a set screw 76 so that spindle wheel 75 rotates with spindle 36. The cup of the spindle wheel 75 extends toward the nominal plane of the floppy disc 22 and has an annular surface 32 parallel to the nominal plane of the floppy disk 22 formed on the edge of its rim. Annular surface 32 is located either at or very close to the nominal plane of the floppy disk 22 and has an inside radius approximately equal to the radius of the center opening of the floppy disk 22 and an outside radius greater than the radius of the center opening 26 of the floppy disk 22 so that the part of a floppy disk 22 near its center opening 26 which is not covered by the floppy disk envelope 24 may be pressed against the surface 32.

The annular surface 32 contains an annular groove 33 in which is disposed an elastomeric O-ring 37. The thickness of O-ring 37 is slightly greater than the depth of the annular groove 33 in order to enhance the friction between the floppy disk 22 and the spindle wheel 75 when the floppy disk 22 is pressed against the spindle wheel 75 and to thereby increase the rotating torque supplied by the spindle wheel 75 to the disk 22.

A second annular surface 79 is located adjacent to and concentric with the annular surface 32. As the radius of this second annular surface 79 increases, the surface moves further from the nominal plane of the floppy disk 22. This second annular surface 79 thus helps guide the floppy disk envelope 24 past spindle wheel 75 and the annular surface 32 as the envelope 24 is inserted into the main compartment 70 along the guides 30.

On the opposite side of the floppy disk 22 from the spindle 36 and the spindle wheel 75 is located a clutch mechanism 40. Clutch mechanism 40 is mounted on a clutch rod 80 by means of retaining rings 82 and 84 placed on clutch rod 80. Clutch rod 80 extends through a first bearing 86 placed on the side wall of the main compartment 70 and a second bearing 88 placed in a wall member 90. Clutch rod 80 is located along the same line as spindle 36 and moves longitudinally along the same axis about which the spindle 36 rotates. The bearings 86 and 88 assist this longitudinal movement.

Wall member 90 is parallel to the side wall of main compartment 70 and held parallel to it by attachment to the two side members 92, which in turn are attached to the side wall of the main compartment 70. Wall member 90 and side members 92 thus form a small partial enclosure for the components of the clutch engaging and disengaging mechanism 42 as well as provide mounting surfaces for some of the components of that mechanism as will be discussed.

As best seen in FIGS. 6 and 7, the rotatable clutch mechanism 40 has an inner concentric portion 94 and an outer concentric portion 98. The inner concentric portion 94 of the clutch mechanism 40 is coupled to the non-rotating clutch rod 80 by means of bearings 95 press-fitted into inner concentric portion 94. Retaining rings 82 and 84 attached to clutch rod 80 prevent inner concentric portion 94 from moving longitudinally with respect to clutch rod 80. Forming a thick cylindrical sleeve about clutch rod 80, the inner concentric portion 94 has an outwardly extending annular rim 96 located on its outer cylindrical surface. This annular rim 96 is positioned on the inner concentric portion 94 toward the end furthest from the spindle mechanism 35.

The outer concentric portion 98 of the clutch 35 mechanism 40 has a cylindrical inner surface and is placed concentrically with the inner concentric portion 94. The inside radius of the cylindrical inner surface of the outer concentric portion 98 is slightly larger than the radius of the outwardly projecting annular rim 96 located on the inner concentric portion 94. Extending inward from the cylindrical surface of the outer concentric portion 98 and positioned toward the end closest to spindle mechanism 35 is an inwardly extending annular rim 100, the inside radius of which is slightly larger than the radius of the inner concentric portion 94. The outer concentric portion 98 is thus permitted to move longitudinally with respect to the inner concentric portion 94 and clutch rod 80 and is also permitted to tilt a small amount with respect to inner concentric portion 94 and clutch rod 80.

Toward the side of inner concentric portion 94 closest to the spindle mechanism 35 is a small annular groove for holding a retaining ring 102. The outer radius of retaining ring 102 is slightly larger than the inside radius of the inwardly extending annular rim 100 of the outer concentric portion 98. This, retaining ring 102 and the outwardly extending annular rim 96 located on the inner concentric portion 94 limit the possible longitudinal movement of the outer concentric portion 98 with respect to the inner concentric portion 94 and the clutch rod 80.

A helical spring 104 whose inside radius is larger than the radius of the inner concentric portion 94 and whose outside radius is smaller than the inside radius of the outer concentric portion 98 is placed between the inner concentric portion 94 and the outer concentric portion 98. This spring 104 is placed between and bears against the facing surfaces of the outwardly extending annular rim 96 of the inner concentric portion 94 and the inwardly extending annular rim 100 of the outer concentric portion 98. Thus spring 104 tends to press the outer concentric portion 98 forward toward the spindle mechanism 35 so that the inwardly extending annular rim 100 bears against the retaining ring 102. It will be noticed, however, that the outer concentric portion 98 may be pushed back compressing spring 104, thereby moving the outer concentric portion 98 longitudinally relative to the inner concentric portion 94 and the clutch rod 80. However, when not so pushed, the inwardly extending annular rim 100 of the outer concentric portion 98 rests against the retaining ring 102.

It is desired that the outer concentric portion 98, while retaining some freedom of longitudinal motion with respect to the inner concentric portion 94 and the clutch rod 80 and some freedom to tilt relative to these components, rotate with the inner concentric portion 94. Small outward projections on the outwardly extending annular rim 96 fitting in corresponding longitudinally oriented grooves in the outer concentric portion 98 will permit relative longitudinal motion between the inner concentric portion 94 and the outer concentric portion 98 while ensuring that the outer concentric portion 98 rotates with the inner concentric portion 94. Alternatively, inward projections on the inwardly extending annular rim 100 may slide in longitudinally oriented grooves in the inner concentric portion 94 to allow the same result.

The outer concentric portion 98 has a recessed rim 106 with a plane annular surface 34 located thereon and situated parallel to the annular surface 32 located on the spindle wheel 75. The inner and outer radii of the annular surface 34 are approximately the same as those on the corresponding annular surface 32 located on the spindle wheel 75. As shown in FIG. 7, when the clutch mechanism 40 is moved toward the spindle mechanism 35, the annular surface 34 and the O-ring 37 initially will contact and bear against the portion of the floppy disk 22 adjacent to its center opening 26. After the initial contact between the annular surfaces 34 and 32 and the floppy disc 22, further movement of the clutch mechanism 40 toward the spindle 36 results in O-ring 37 being compressed. The amount of compression of O-ring 37 and thus the force with which the floppy disk is grasped is determined by the spring constant and the amount of compression of spring 104, and not by the total force upon the clutch rod 80 tending to push the clutch rod 80 toward the spindle mechanism 35. The spring constant and the amount of compression are selected so that O-ring 37 is compressed within annular groove 33 and the annular surface 32 contacts the floppy disk 22.

It will also be noticed that the annular surface 34 is recessed from the front surface 66 of the clutch mechanism 40. However, when the spring 104 is compressed, this recess is less than the distance from the annular surface 32 to the bottom surface 68 of the spindle wheel 75 so that the clutch mechanism 40 and the end of the clutch rod 80 do not come into contact with the surface 68.

The clutch engaging and disengaging mechanism 42 is located between the main compartment 70 and wall member 90. In the preferred embodiment, an annular collar 108 is secured to the clutch rod 80. A helical spring 110 is located concentrically around the clutch rod 80 between the annular collar 108 and the main compartment 70. Helical spring 110 bears on the surfaces of the annular collar 108 and the main compartment 70, tending to separate the two and thereby move the clutch rod 80 and the clutch mechanism 40 away from the spindle mechanism 35 and the plane of the floppy disk 22.

The clutch engaging and disengaging mechanism 42 has a lever 112 formed of a U-shaped channel member. Lever 112 pivots about a pin 116 which extends through the sides of the U-shaped channel member that forms lever 112. Pivot pin 116 is attached perpendicularly to the side walls 92 and is located below the clutch rod 80. An opening 114 in the base of the U-shaped channel member forming lever 112 is sized to allow the end of clutch rod 80 to pass through but not to allow the larger diametered annular collar 108 to pass through. Lever 112 extends above clutch rod 80 so that a force tending to push the top of lever 112 toward the main compartment 70 of the apparatus 20 causes lever 112 to pivot on pin 116 and to push the collar 108 against spring 110 and hence to push the clutch rod 80 and clutch mechanism 40 toward the floppy disk 22 and the spindle mechanism 35. Such a force causes the annular surfaces 34 and 32 and the O-ring 37 to grasp the floppy disk 22. When the force is released, spring 110 pushes against collar 108, causing lever 112 to pivot in the opposite direction about pin 116. This disengages the clutch mechanism 40 from the spindle mechanism 35 and releases the floppy disk 22.

In the preferred embodiment, the lever 112 of the engaging and disengaging mechanism 42 is actuated by a reversible motor 120 acting in cooperation with the strap 122 attached near the top of the lever 112. An elongated slot 123 running across the base of the U-shaped channel member forming lever 112 is sized to accommodate strap 122 which is passed through slot 123 and attached to itself forming a loop. A pin 124 extends between the side walls 92. Pin 124 is located above clutch rod 80 and the top of lever 112, and is placed further toward the main compartment 70 than the point of furthest travel of the top part of lever 112.

The reversible motor 120 is mounted on one of the side members 92 outside the partial enclosure formed by the side members 92 and the wall member 90 with its shaft 128 extending between side members 92. Shaft 128 is located above pin 124 and closer to wall member 90 than is pin 124. From lever 112, strap 122 is directed toward main compartment 70 and around pin 124 (in a counterclockwise direction as viewed in FIG. 6) to shaft 128 where it is attached. As motor 120 rotates shaft 128 in a clockwise direction (as viewed in FIG. 6) strap 122 is wound upon shaft 128, thereby pulling lever 112 in the direction indicated by the arrow adjacent to strap 122 in FIG. 6, i.e., the top part of lever 112 is pulled toward main compartment 70. This pushes annular collar 108, clutch rod 80 and clutch mechanism 40 toward the floppy disc 22 and the spindle mechanism 35.

The engagement of the clutch mechanism 40 with the spindle mechanism 35 causes the lower portion of the lever 112 beneath the pivot pin 116 to depress a limit switch 130. A resultant signal stops the reversible motor 120. Similarly, to disengage the clutch mechanism 40 from the spindle mechanism 35, reversible motor 120 is caused to rotate shaft 128 in the opposite direction. At the same time, helical spring 110 pushes on collar 108 to return lever 112 to its original position. When lever 112 reaches its original position it depresses a second limit switch 132 which results in a signal stopping the action of the reversible motor 120

It has already been noted that when the clutch mechanism 40 is engaged with the spindle mechanism 35, the force with which the floppy disk 22 is grasped by the annular surfaces 34 and 32 and the O-ring 37 is determined by the spring constant and the compression of spring 104. However, the speed with which annular surface 34 impacts a floppy disk 22 is determined by the speed at which lever 112 is moving against annular collar 108. It will be appreciated that the above-described arrangement, employing the reversible motor 120, the flexible strap 122, the lever 112 and associated components, allows the clutch mechanism 40 to be engaged with the spindle mechanism 35 at a moderate rate of speed and therefore annular surface 34 to impact floppy disk 22 also at a moderate rate of speed, thereby minimizing the possible damage to floppy disk 22 which could result from a high speed impact of annular surface 34 against floppy disk 22 in the region adjacent to tne center opening 26.

Figure 8:
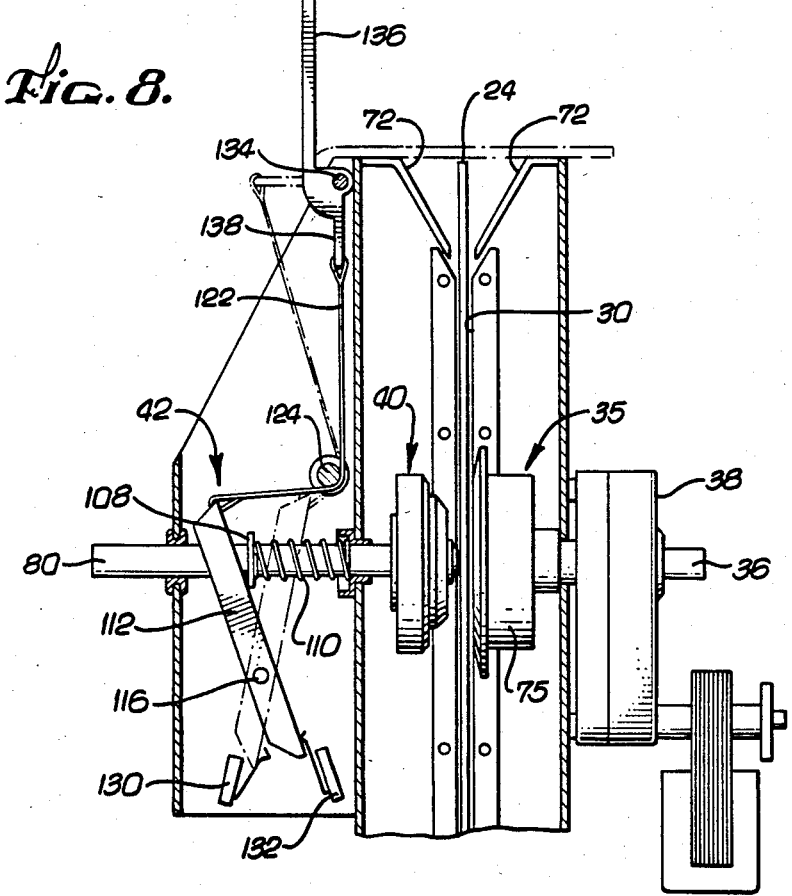
FIG. 8 is a view of the apparatus of the present invention showing an alternate embodiment of the mechanism for engaging and disengaging the clutch and spindle mechanisms.

An alternate embodiment for the clutch engaging and disengaging mechanism 42 is shown in FIG. 8. As in the preferred embodiment previously described, a lever 112 pivoting about a pin 116 and a strap 122 attached to the top of the lever 112 and directed around a pin 124 are used. However, in this embodiment, the reversible motor 120 and rotating shaft 128 are not used. The engaging and disengaging motor is supplied by a mechanical lever pivoting about the axis 134. The long arm 136 of this lever actually forms a closeable top for the main compartment 70 of the apparatus 20 while the short arm 138 is attached to the second end of strap 122. After a floppy disk has been inserted into the main compartment 70 of the apparatus 20, the long arm or cover 136 is closed. This pulls the strap 122 resulting in the top part of lever 112 moving toward the main compartment 70 thereby engaging the clutch mechanism 40 with the floppy disk 22 and the spindle mechanism 35 as previously described. When the conditioning procedure is completed, cover 136 is lifted thereby allowing lever 112 to return to its original position under the influence of spring 110. Again, the speed of impact of the annular surface 34 of the outer concentric portion 98 of the clutch mechanism 40 on the floppy disk 22 is moderate due to the long lever arm provided by cover 136. Other arrangements for engaging the clutch mechanism 40 with the floppy disk 22 and the spindle mechanism 35 are, of course, possible.

Figure 14:
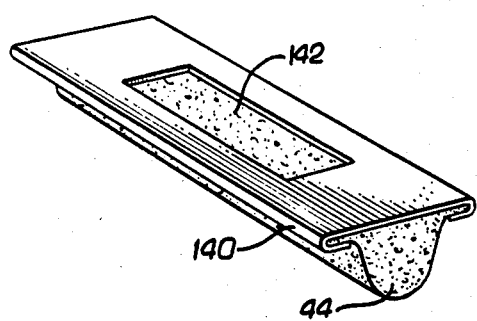
FIG. 14 is a perspective view of a preferred embodiment of a conditioning pad in a pad clip.

After a floppy disk 22 has been inserted into the main compartment 70, the pads 44 used to condition the magnetic surfaces of the floppy disk 22 may be saturated with cleaning fluid. In the preferred embodiment, the pads 44 are formed of plastic open-celled foam. To facilitate use in the apparatus 20, a foam pad 44 is held in a clip 140. A preferred embodiment of this clip 140 is shown in FIG. 14. The clip 140 has a small piece of sheet metal which is bent along its two long sides in order to crimp the edge of the foam pad 44. A large opening 142 or several small ones in the sheet metal piece allows conditioning fluid access to the back of the pad 44.

The crimping of the edge of foam pad 44 by clip 140 results in foam pad 44 having an arcuate profile as can be seen in FIG. 14. Since the peak of the arcuate profile of the foam pad 44 is furthest from clip 140, foam pad 44 first contacts the floppy disk 22 along an arcuate edge when being placed in contact with the floppy disk. Thereafter, foam pad 44 continues to be pressed against floppy disk 22 so that more of foam pad 44 adjacent to the arcuate edge gradually contacts the floppy disk, as can be seen in FIG. 13. Similarly, when foam pad 44 is lifted from the surface of floppy disk 42, the removal of foam pad 44 from contact with the surface of floppy disk 22 is gradual, foam pad 44 last being lifted from floppy disk 22 along the arcuate edge. It will be appreciated that as a result of the arcuate profile of foam pad 44, parting lines of excess conditioning fluid are much less likely to be left on floppy disk 22 when foam pad 44 is lifted from the surface of floppy disk 22 than if foam pad 44 contacted floppy disk 22 along a flat side.

Figure 15:
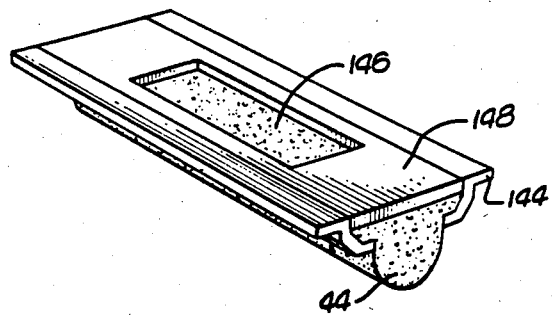
FIG. 15 is a perspective view of an alternate embodiment of a conditioning pad in a pad clip.

An alternate embodiment of a pad clip is shown in FIG. 15. This clip has a metal or plastic housing 144 having a window 146 located in its cover 148. A foam pad 44 is inserted from the back into the clip. A plastic or metal cover 148 may be snapped or pressed into place against the foam pad 44 to hold it in the proper position. In this embodiment, the cover 148 may be removed and the pad 44 disposed of and replaced with a new pad 44 when desired. It will be appreciated that many embodiments of pads and pad clips are suitable for use in the present invention.

In the preferred embodiment of the present invention, two pads 44 are used to condition the surfaces of a floppy disk 22. The pads 44 are disposed on opposite sides of the floppy disk 22 directly opposite each other. The pads 44 contact the floppy disk 22 through the read/write openings 28 in the disk envelope if the floppy disk 22 has been inserted properly in the main compartment 70 as shown in FIG. 1.

As seen in FIGS. 3 and 13, the pads 44 and the pad clips 140 are disposed in pad clip mounts 150. Each of the pad clip mounts 150 has a pair of oppositely disposed grooves 152 into which the sides of a pad clip 140 may be inserted by sliding. A fitting 154, to which may be attached flexible tubing for supplying each pad 44 with conditioning fluid is attached to the back of each pad clip mount 150.

Each pad clip mount 150 is itself mounted on a generally flat pad swing plate 46 rigidly attached to a pivoting pin 48. At one end, pivoting pins 48 are mounted in bearings 162 carried in brackets 160. Brackets 160 are located inside and near the top on each side of main compartment 70 and are parallel to the front side 74 of main compartment 70. The other end of pivoting pins 48 proceed through bearings 163 mounted in the front side 74 of main compartment 70. The bearings 162 and 163 allow the pivoting pins 48 to rotate. Thus pads 44 are swung toward or away from the surfaces of the floppy disk 22 on the pivoting pins 48.

Attached to that end of each pivoting pin 48 which extends outside the main compartment 70 near the front side 74 are pulleys 164 and 166. The pulleys 164 and 166 contain narrow grooves along their peripheries for placement therein of a line 166. The line 168, preferably stranded metal wire, is attached to pulleys 164 and 166 and proceeds in the groove of pulley 166 in a clockwise direction and in the groove pulley 164 in a counterclockwise direction as viewed in FIG. 5. Line 168 then proceeds downward across the front of the main compartment 70 to a control mechanism.

Figure 4:
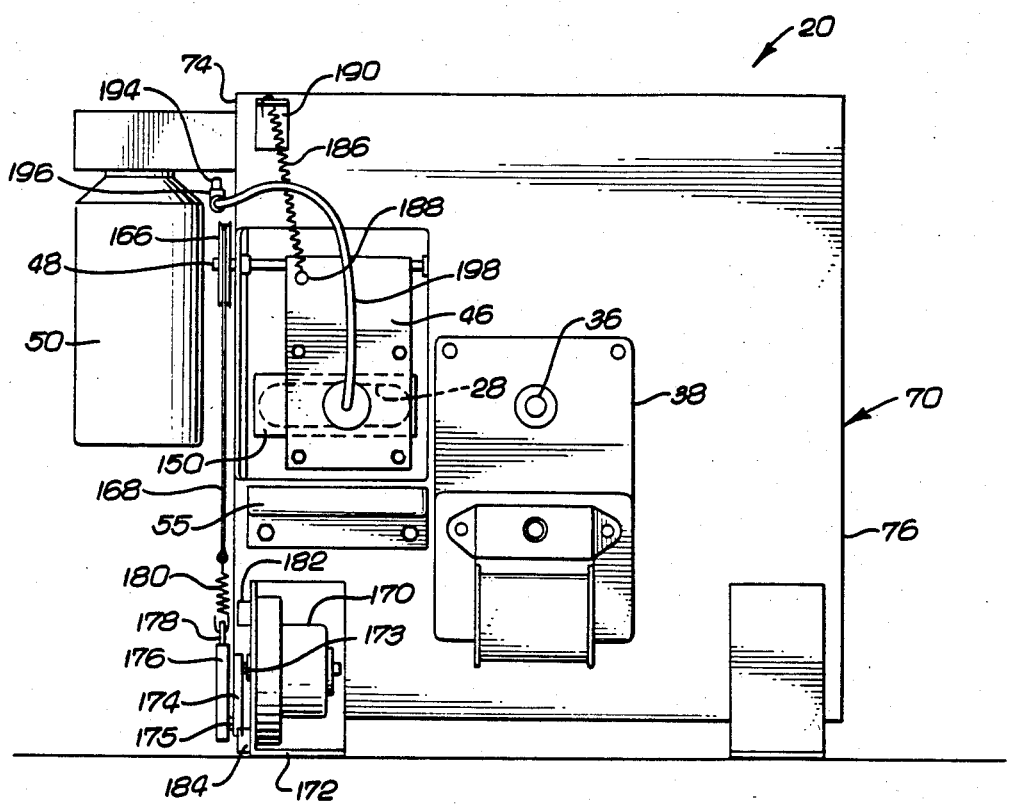
FIG. 4 s a side view of the preferred embodiment of the present invention taken along the lines 4—4 in FIG. 3, showing the side of the apparatus opposite to that shown in FIG. 2.

As seen in FIG. 4, the control mechanism includes an A.C. motor 170 which is mounted on a bracket 172. Motor 170 rotates shaft 173 180 degrees when activated. Short first arm 174 is attached near one end to shaft 173 so that it rotates in a plane perpendicular to shaft 173 when shaft 173 rotates. Short pivot pin 175 is fixedly attached to the other end of the short first arm 174 and is aligned perpendicular to the plane of motion of the short first arm 174. Attached near one of its ends to pivot pin 175 is short second arm 176 which rotates about pivot pin 175 in a plane parallel to that in which the short first arm 174 rotates. At the other end of this short second arm 176 is a hook 178. A stiffened coil spring 180 is connected on one end to hook 178 and on the other end to the line 168 which proceeds around the pulleys 164 and 166 as described above.

Figure 5:
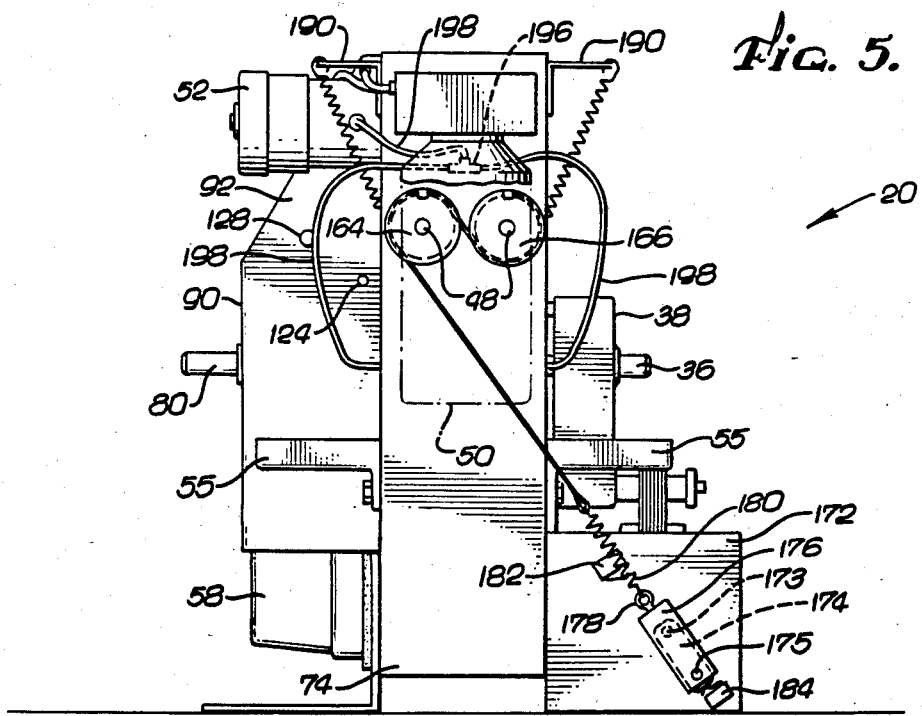
FIG. 5 is a view of the preferred embodiment of the present invention taken along the lines 5—5 in FIG. 2, showing the front portion of the invention with the conditioning fluid reservoir shown in phantom.

Connected between each pad swing plate 46 at 188 and brackets 190 mounted on the sides near the top of the main compartment 70 are coil springs 186, as can be seen in FIGS. 2, 4, 5, and 13. These coil springs 186 tend to pull their associated pad swing plates 46 and pads 44 away from the floppy disk 22 and into the horizontal positions are shown in phantom in FIG. 13. However, when the first short arm 174 connected to the motor 170 is in the position as shown in FIGS. 4, 5 and 13, this tendency is overcome by the tension in spring 180 connecting the second short arm 176 to the line 168. Upon activation of motor 170, the first short arm 174 rotates 180 degrees while the second short arm 176 maintains its same general orientation, pivoting on pivot pin 175 in response to the tension in spring 180. The second short arm 176, therefore, is effectively displaced in a direction toward pulley 164 by a distance equal to twice the distance between the shaft 173 of the motor 170 and the pivot pin 175. This releases some of the tension in the spring 180 and allows the effect of springs 186 to predominate and pull the pad swing plates 46 from the vertical to the horizontal positions. In the process, pulleys 166 and 164 rotate respectively in the counterclockwise and clockwise directions, thereby shortening the length of the line 168 between pulley 164 and spring 180 and helping to keep some tension in spring 180.

When motor 170 is activated again to lower the pad swing plates 156 from the horizontal to the vertical position, the first and second short arms 174 and 176 reposition themselves as shown in FIGS. 4, 5 and 13. The resulting increase in tension in spring 180 pulls line 168, rotating pulleys 164 and 166 and thereby lowering the pad swing plates 156 into the vertical position. The pressure of the pads 44 against the floppy disk 22 is determined by the difference in force exerted by the spring 180 and the springs 186.

The limit switches 182 and 184, best seen in FIG. 13, are contacted by the first short arm 174 connected to the motor 170 as it is rotated. The pressing of either of these limit switches 182 or 184 by the first short arm 174 results in an electrical signal which automatically stops the motor 170 after the short arm 174 has been rotated 180 degrees by the motor 170.

FIG. 9 is a schematic diagram of the fluid dispensing system. In the preferred embodiment, the fluid dispensing system saturates the pads 44 when the pad swing plates 46 are in the horizontal position. The input side of a solenoid valve 52 is connected by flexible tubing 192 to a bottle or reservoir 50 containing conditioning fluid while the output side is connected by flexible tubing 194 to a T-fitting 196. Flexible tubing 198 is used to connect the T-fitting 196 to the fittings 154 located in the pad clip mounts 150 for the pads 44.

An air pump 58 and a ball check valve 60 are used in the preferred embodiment. The solenoid valve 52 and the air pump 58 are both controlled by an electrical signal that opens the valve 52 and starts the pump 58. The air pump 58 lifts ball 62 of the ball check valve 60 from its seat 64, pumping air through tubing 200 into the reservoir 50 and forcing fluid out of the reservoir 50 through the opened solenoid valve 52 to the pads 44. After a predetermined period of time during which the pads 44 are thoroughly saturated with conditioning fluid, the air pump 58 is stopped and the solenoid valve 52 is closed. Excess fluid dripping from the pads 44 is collected by trays 55 mounted to the sides of main compartment 70.

Solenoid valve 52 not only stops the continued flow of conditioning fluid by gravity to the pads 44 when the air pump 58 is stopped but also prevents the loss of the highly volatile conditioning fluid through evaporation during the time when the fluid is not being pumped to the pads 44. The reseating of ball 62 in seat 64 of ball check valve 60 when the air pump 58 is stopped also helps to prevent the loss of conditioning fluid.

FIGS. 10, 11 and 12 show alternate embodiments of fluid dispensing systems for the present invention. In the system of FIG. 10, gravity feed of conditioning fluid from the fluid reservoir 204 to the pads 44 is used. Reservoir 204 is therefore positioned higher than the pads 44. A limit valve 206 is placed between the reservoir 204 and the pads 44. This valve 206 is mechanically operated and is opened only when the clutch mechanism 40 is engaged. The quantity of fluid reaching the pads 44 is controlled by the duration of the air pump 208 which unseats the ball check valve 210. Only when this valve 210 is unseated will fluid be allowed to flow from the reservoir 204 under the influence of gravity.

In the fluid dispensing system shown in FIG. 11, the effect of gravity on the fluid in reservoir 212 is not sufficient by itself to unseat the spring loaded ball valve 214 located between the reservoir 212 and the pads 44. A fluid pump 215 is therefore inserted between reservoir 212 and spring loaded ball valve 214. When this pump 215 is operating, the ball 216 in the ball valve 214 is unseated to allow fluid to reach pads 44. The ball check valve 218 allows air to enter reservoir 212 when the pressure difference between the atmosphere and the volume which has been vacated by fluid in reservoir 212 is sufficient to unseat the ball 220 from its seat 222. At other times, ball 220 remains in seat 222 to prevent loss of conditioning fluid through evaporation.

Yet another embodiment of the fluid dispensing system is shown schematically in FIG. 12. This system also relies on gravity feed to supply the pads 44 with fluid from the reservoir 224. In this embodiment, a valve 226, operated either by a solenoid or mechanically, is placed between the pads 44 and the reservoir 224. When valve 226 is opened, fluid is allowed to saturate the pads 44. A lightly seated ball check valve 228 operates in a manner similar to that described with respect to ball check valve 218 in FIG. 11 in order to allow the fluid vacated from reservoir 224 to be replaced by air, but to otherwise seal off the fluid in reservoir 224 from the atmosphere.

A preferred procedure for conditioning a floppy disk using the above-described apparatus will now be described. It will be recognized, however, that many variations in the order or method of activating or deactivating the various components of the apparatus of the present invention are possible and within the scope of the present invention.

First the floppy disk 22 in its envelope 24 is inserted into the main compartment 70 of the apparatus 20 between the guides 30 with the read/write openings 28 oriented as shown in FIG. 1. The clutch engaging and disengaging mechanism 42 is then activated, the lever 112 being initially in the position shown in FIG. 6. The reversible motor 120 rotates shaft 128 in a clockwise direction thereby winding strap 122 upon shaft 128 and forcing the top part of lever 112 against the collar 108 which is secured to the clutch rod 80. The clutch mechanism 40 is thus pushed toward the floppy disk 22 and the spindle mechanism 35. The annular surface 34 presses the floppy disk 22 against the O-ring 37 and the annular surface 32 located on spindle wheel 75, that part of the clutch mechanism 40 which is closer to the floppy disk 22 than is the annular surface 34 being sized to fit through the opening 26 in the floppy disk 22. Further movement of the clutch mechanism 40 towards the spindle mechanism 35 compresses the helical spring 104 between the inner concentric portion 96 and the outer concentric portion 98 of the clutch mechanism 40 to firmly grasp the floppy disk 22. The motion of the clutch mechanism 40 continues until limit switch 130 is depressed by the lever 112 and the reversible motor 120 is stopped.

For the fluid dispensing operation the pad swing plates 46 are in the horizontal position, such as is shown in phantom in FIG. 13. The fluid dispensing operation is begun by an electrical signal. This signal may be preset in a controller or may be triggered when limit switch 132 is released at the beginning of the motion of lever 112 of the clutch engaging and disengaging mechanism 42. The signal begins the air pump 58. This unseats the ball check valve 60 so that air is pumped into reservoir 50 through line 200. Simultaneously, the solenoid valve 52 is opened so that fluid is pumped from the reservoir 50 through tubing 194 to the T-connection 196 and from there through the tubing 198 to the respective pads 44 associated with each pad swing plate 46. The excess fluid is allowed to drip from the pads 44 into the trays 55.

After a predetermined period of time electrical signals stop the air pump 58 and close the solenoid valve 52. An electrical signal starts the electric motor 38 which rotates the spindle mechanism 35 and the now-engaged clutch mechanism 40 and floppy disc 22. Thereafter, motor 170 is activated by an electrical signal to rotate the first short arm 174 connected to its shaft 173 and the short second arm 176 180 degrees into the positions shown in FIGS. 4, 5 and 13 until the limit switch 182 is depressed, triggering a signal that stops the motor 170. The resultant increased force on line 168 causes the pulleys 164 and 166 to rotate counterclockwise and clockwise respectively so that the force of springs 186 is overcome and the pad swing plates 46 are swung from their horizontal positions to vertical positions such as is shown in FIG. 13, the pads 44 thereby contacting the magnetic surfaces of the rotating floppy disk 22 through the read/write openings 28 in the floppy disk envelope 24.

After a predetermined period of time during which the pads 44, saturated with conditioning fluid, have swept over the surfaces of the floppy disk 22, motor 170 is again activated by an electrical signal to return the pad swing plates 46 to their horizontal positions through the actions of springs 186, the pads 44 thereby being lifted off the surfaces of the floppy disk 22. The pressing of limit switch 194 by the rotating first short arm 174 stops motor 170 and this motion. Another electrical signal starts reversible motor 120 so that it rotates the shaft 128 in the direction opposite to that in which shaft 128 was first rotated to engage the clutch mechanism 40 with the spindle mechanism 35 to grasp the floppy disk 22. The consequent unwinding of strap 122 from shaft 128 allows the helical spring 110 to push the collar 108 and the lever 112 and hence to disengage the clutch mechanism 40 from the floppy disk 22 and the spindle mechanism 35. When the limit switch 132 is depressed by the lever 112, the reversible motor 120 is turned off. A clean, static-free and lubricated floppy disk 22 may then be removed from the apparatus 20 by sliding it upwards between the guides 30.

The present invention has been described with respect to the use of a fluid which cleans, lubricates and destaticizes the surfaces of floppy disks. The use of a fluid which performs any one or more of these functions, but not all of them, such as the use of a fluid which cleans but does not lubricate or de-staticize, is also within the scope of the present invention.

Preliminary laboratory testing has confirmed that treatment of a floppy disk with cleaning fluid containing a lubricant in the manner as has been described herein on a periodic basis during the life of the disk not only enhances the reliability of data transfer between the disk and magnetic head but significantly extends the useful life of the floppy disk. Comparative tests were done in the laboratory on conditioned and unconditioned disks in order to measure cleaning effectivity, magnetic performance, addition or removal of surface lubricants, and lubricant effectivity.

Cleaning effectivity is measurable by visual and microscopic inspection of the media surface and, along with magnetic performance, by tests with a certifier, which is a diagnostic apparatus for measuring various characteristics of magnetic performance such as average signal amplitude, missing or extra pulses, and resolution ratio. An example of a certifier is the apparatus designated "Three Phoenix SPX 134."

The addition or removal of surface lubricants is found to be most satisfactorily determined by weighing with an analytical scale the disk before and after treatment with fluid containing a lubricant.

Lubricant effectivity is determined by measuring the frictional drag, or coefficient of friction between the magnetic head and the disk surface under normal disk running conditions in a disk-drive through use of a special test fixture employing semiconductor strain gauges mounted on the arm which supports the magnetic head in the disk drive. The significance of friction is that lower friction between the magnetic head and disk surface will result in greater endurance and longer life for the disk.

Comparative tests on new disks have demonstrated that surface friction is reduced when new disks are treated with fluid containing a lubircant as has been described herein and that total lubricant weight on the disks is generally also reduced. This was observed, for example, in different brands of new disks initially carrying 8 milligrams and 20 milligrams of lubricant respectively and treated with a fluid having a Freon TF base and containing commonly used lubricants such as are initially placed on newly manufactured disks. As has been previously described most floppy disks are marketed with an amount of lubricant thereon exceeding the level required for best performance, as prior to the present invention, it could not be expected that the disk would thereafter ever be lubricated again. The weight of treated disks was found to reach a stable level after about six treatments. In the case of the two brands of disks discussed having 8 and 20 milligrams of lubricant thereon initially, the weight of the lubricant was found to stabilize at about 4.7 and 4.5 milligrams respectively. A clear correlation was also shown between such lower levels of lubrication and lower friction. However, with levels of lubrication significantly below such levels, friction will rise sharply. Thus an optimal or desirable range of lubrication at which friction is reduced exists for many floppy disks at a level below that with which the disks are initially provided, and treatment according to the present invention can result in a more desirable level of lubrication on such disks.

In addition, when new disks were treated according to the present invention certifier tests indicated fewer missing pulses after conditioning than before.

Comparative tests in which identical disks were run on identical disk drives in which half of the disks were regularly treated with fluid containing a lubricant as described herein and half were never so treated conclusively demonstrated that the lives of the treated disks were significantly increased by such periodic treatment. In particular, it was found that conditioning disks in the manner described herein after every hour of use increased the life of the disks in some cases by more than 100%. These tests were conducted in a clean environment. Under normal operating conditions, it is expected that reliability and life well be enhanced even more as the problem of contamination is effectively dealt with by the present invention.

It will be appreciated from the above-described preferred embodiment of the present invention and the various alternate embodiments described with respect to certain components or arrangements of components for the present invention that many other configurations are possible and within the scope of the present invention. For example it can easily be envisioned that other mechanisms may be used to raise and lower the pad swing plates 46. One alternative would be to load the pad swing plates 46 on the disk 22 by means of torsional springs wrapped about the pivot pins 48. In addition, other mechanisms could be used to pull the pad swing plates 46 away from the floppy disk 22 as desired or to dispense fluid to the pads 44.

Thus, the present invention is not intended to be limited to the particular embodiments specifically discussed hereinabove.

I claim:

1. A system for treating a floppy disk disposed in an envelope with conditioning fluid to clean, lubricate, and de-staticize said floppy disk comprising:
a first fluid absorbing pad;
means for moving said first fluid absorbing pad into and out of contact with a first magnetic information storing surface of said disk through a read-write opening in the envelope;
fluid dispensing means for providing conditioning fluid to said first fluid absorbing pad; and
means for rotating said floppy disk about its center, said envelope remaining stationary while said floppy disk is rotating, so that said first magnetic information storing surface is treated with conditioning fluid by means of contact of said surface with said first pad to which fluid is dispensed.

2. A system as in claim 1 further comprising:
a second fluid absorbing pad;
means for moving said second fluid absorbing pad into and out of contact opposite said fluid absorbing pad with a second magnetic information storing surface of said disk through a read-write opening in the envelope; and
wherein said fluid dispensing means provides fluid to said second fluid absorbing pad in addition to said first fluid absorbing pad whereby said first and second magnetic information storing surfaces are treated simultaneously with conditioning fluid while said floppy disk is rotating by means of contact of said first and second magnetic information storing surfaces with, respectively, said first and second fluid absorbing pads to which fluid has been dispensed.

3. A system as in claim 1 further comprising:
a first pivotable plate on which said first fluid absorbing paid is mounted and wherein said means for moving said pad into and out of contact with a first magnetic information storing surface of said disk is a means of pivoting said first pivotable plate.

4. A system as in claim 3 further comprising:
a second fluid absorbing pad;
a second pivotable plate on which said second fluid absorbing pad is mounted; and
means for pivoting said second pivotable plate so that said second fluid absorbing pad is moved into and out of contact opposite said first fluid absorbing pad with a second magnetic information storing surface of said disk through a read-write opening in the envelope; and
wherein said fluid dispensing means provided fluid to said second fluid absorbing pad in addition to said first fluid absorbing pad whereby said first and second magnetic information storing surfaces are treated simultaneously with conditioning fluid while said disk is rotating by means of contact of said first and second surfaces with, respectively, said first and second pads to which fluid has been dispensed.

5. A system as in claim 4 wherein said first and second pads each have a surface spanning, along a radius of the disk, the entire portion of a disk surface usable for magnetic information storage.

6. A system as in claim 5 wherein said first and second pads each have an arcuate profile, the peak of said arcuate profile of each pad being the first portion of said pad placed in contact and the last portion of said pad removed from contact with the respective magnetic information storing surface of said disk when said pad is removed respectively into and out of contact with said magnetic information storing surface.

7. A system as in claim 4 wherein said fluid dispensing means comprises:
a container for holding conditioning fluid;
gravity feed means for supplying conditioning fluid from said container to said first and second pads;
a valve means for regulating the supply of conditioning fluid to said first and second pads.

8. A system as in claim 4 wherein said fluid dispensing means comprises:
a container for holding conditioning fluid; and
pump means for supplying conditioning fluid from said container to said first and second pads.

9. A system as in claims 7 or 8 further comprising a means for preventing evaporation of said conditioning fluid from said container when said conditioning fluid is not being supplied and for allowing gas to enter said container while conditioning fluid is being supplied to replace said fluid.

10. A system as in claim 4 wherein said fluid dispensing means comprises:
a container for holding conditioning fluid; and
an air pumping means for forcing said conditioning fluid from said container into said first and second pads.

11. A system as in claim 10 wherein said fluid dispensing means further comprises means for preventing the evaporation of said conditioning fluid when said fluid dispensing system is not providing conditioning fluid to said first and second pads.

12. A system as in claim 4 further comprising a control means coupled to said means for pivoting said first pivotable plate, said means for pivoting said second pivotable plate, said fluid dispensing means and said means for rotating said floppy disk.

13. A system as in claim 4 wherein said fluid dispensing means, said means for rotating said disk, said means for pivoting said first pivotable plate and said means for pivoting said second pivotable plate are controlled by electrical signals.

14. A system as in claims 1 or 4 wherein said means for rotating said floppy disk comprises:
a motor-driven spindle; and
a clutch mechanism engageable with said spindle and said disk so that said disk is grasped between said spindle and said clutch mechanism proximate to the center opening in said disk.

15. A system as in claims 1 or 4 wherein said means for rotating said floppy disk comprises:
- a motor-driven spindle having an annular surface protruding toward said disk, said surface being parallel to the nominal plane of said disk and having an inside radius approximately equal to the radius of the center opening of said disk and an outside radius slightly smaller than the radius of the center opening in the envelope of said disk; and
- a clutch mechanism centered about the axis of the spindle and located on the opposite side of the disk than said spindle, said clutch mechanism having an annular surface parallel to the annular surface on said spindle, said annular surface having inside and outside radii approximately equal to those on the annular surface on said spindle, said annular surfaces cooperating to grasp said disk between said annular surfaces when said disk is centered on the axis of said spindle.

16. A system as in claim 15 wherein said clutch mechanism further comprises:
- an outer concentric portion on which said annular surface of said clutch mehcanism is located;
- an inner concentric portion having a first rim extending outward toward said outer concentric portion, said outer concentric portion having a second rim extending inward toward said inner concentric portion with said first rim located further from said spindle than said second rim; and
- a helical spring placed concentrically between said inner and outer concentric portions and between said first and second rims whereby said annular surfaces grasp said disk therebetween when said inner concentric portion of said clutch mechanism is pushed toward said spindle to compress said spring.

17. A system as in claim 1 wherein said means for rotating rotates said floppy disk in a vertical plane.

18. A method for treating with a conditioning fluid a flexible rotatable magnetic disk disposed in a jacket, said jacket having a read-write opening for insertion therethrough of a magnetic head during use, said method comprising the steps of:
- disposing conditioning fluid on a pad;
- rotating the disk while keeping the jacket from rotating; and
- placing the pad into contact with the disk through the read-write opening in the jacket.

19. A method for treating with a conditioning fluid a flexible rotatable magnetic disk disposed in a jacket having a read-write opening therethrough for insertion of a magnetic head for reading from or writing on said disk, said method comprising the steps of:
- orienting the disk vertically;
- disposing conditioning fluid on a pad movable into and out of contact with the disk; and thereafter
- rotating the disk within the jacket; and
- moving the pad into contact with the disk through the read-write opening.

20. A method for conditioning a rotatable magnetic information storing disk disposed in an envelope to clean, lubricate and de-staticize said disk, said envelope being provided with a central opening through which a means for rotating the disk may be engaged with the disk and an access opening through which a magnetic head may be inserted for reading or writing information on the disk, comprising:
- engaging the envelope with a means to prevent the envelope from rotating while the disk is rotating;
- providing fluid for conditioning the disk to a pad engagable with said disk through said access opening;
- rotating the disk; and
- engaging the pad with the disk through the access opening.

21. A method for automatically conditioning a rotatable magnetic information storing disk in an envelope to clean, lubricate and de-staticize said disk with an apparatus comprising:
- inserting said disk into said apparatus so that guides in said apparatus engage said envelope; and thereafter
- rotating said disk with a means provided on said apparatus which engages said disk near its center; and
- moving a pad on said apparatus having conditioning fluid thereon into contact with said disk.

22. A method as in claim 21 further comprising:
- providing conditioning fluid to said pad from a reservoir on said apparatus containing said fluid.

23. A method as in claim 22 wherein said fluid is provided to said pad from the reservoir by means of gravity.

24. A method as in claim 22 further comprising:
- controlling by a timing mechanism the relative timing of the steps of providing fluid to said pad, moving said pad into contact with said disk and rotating said disk.

25. A method as in claim 21 or 24 comprising the additional step of moving said pad out of contact with said disk while said disk is still rotating.

26. A method as in claim 25 wherein said pad is mounted on a pivoted arm and is moved into and out of contact with said disk by pivotting said arm.

27. A method as in claim 21 wherein said disk inserted into said apparatus is oriented vertically.

28. A method for simultaneously automatically cleaning both sides of a rotatable magnetic information storing disk disposed in an envelope having a central opening through which a means for rotating the disk may be engaged with the disk and having access openings on each side of the disk opposite one another for insertion therethrough of magnetic heads for reading or writing on said disk, said method comprising:
- engaging the envelope with a means for holding it and preventing said envelope from rotating when said disk is rotated;
- providing cleaning fluid to a pad located on each side of the disk, each said pad engagable with the disk through the access opening on the respective side of the disk;
- rotating said disk; and
- engaging said pads provided with cleaning fluid with the disk.

29. A method as in claim 28 wherein said envelope is held vertically by said means for holding it.

30. A floppy disk conditioning system comprising:
- a housing for supporting and rotating a flexible disk of the type having a least one surface coated with a magnetic material for information storage and contained within a jacket having a read-write opening for insertion therethrough of a magnetic head of the type used for reading information from and writing information on said flexible disk;
- a pad coupled to the housing in a position adjacent the read-write opening of the flexible disk when supported in the housing;

actuation means for moving the pad into contact with the disk surface through the read-write opening; and means for supplying a conditioning fluid to the pad, said pad and fluid operating to clean oxide redeposits, contaminants and the like from said surface and to lubricate and de-staticize said surface when said disk is rotated and said pad is moved into contact with the disk surface.

31. A floppy disk conditioning system as in claim 30 further including the conditioning fluid, wherein said conditioning fluid is a fluid which lubricates and de-staticizes the disk surface as well as cleans oxide redeposits, contaminants and the like from the surface of the disk.

32. A floppy disk conditioning system as in claim 31 wherein the conditioning fluid is highly volatile.

33. A floppy disk conditioning system as in claim 30 wherein said housing includes:
stationary guides to maintain the flexible disk jacket stationary when the flexible disk is rotated;
a motor-driven rotatable spindle; and
a clutch mechanism engageable with the spindle for grasping the floppy disk near its center between the spindle and clutch mechanism whereby the disk is rotated when the spindle is rotated.

34. A floppy disk cleaning system as in claim 30 wherein the actuation means comprises a pivoted plate attached to said housing to which pivoted plate the pad is attached.

35. A floppy disk conditioning system as in claim 30 wherein said pad has an arcuate profile.

36. A method for simultaneously automatically conditioning both sides of a rotatable magnetic information storing disk to clean, lubricate and de-staticize said disk, said disk disposed in an envelope having a central opening through which a means for rotating the disk may be engaged with the disk and having access openings on each side of the disk opposite one another for insertion therethrough of magnetic heads for reading or writing on said disk, said method comprising:
engaging the envelope with a means for holding it and preventing said envelope from rotating when said disk is rotated;
providing conditioning fluid to a pad located on each side of the disk, each said pad engagable with the disk through the access opening on the respective side of the disk;
rotating said disk; and
engaging said pads provided with conditioning fluid with the disk.

37. A method as in claim 36 wherein said envelope is held vertically by said means for holding it.

38. A method as in claim 37 further comprising the additional step of permitting excess fluid applied to said pad to drip therefrom before said pad is moved into contact with disk.

39. A method for treating with a fluid containing a lubricant, a flexible rotatable magnetic disk disposed in a jacket, said jacket having a read-write opening for insertion therethrough of a magnetic head during use, said method comprising the steps of:
disposing said fluid on a pad;
rotating the disk while keeping the jacket from rotating; and
placing the pad into contact with the disk through the read-write opening in the jacket.

40. A method as in claim 39 wherein said steps are performed at regular intervals during the life of the flexible rotatable magnetic disk, whereby the useful life of said disk is extended.

41. A method as in claim 40 wherein said steps are also performed prior to using the flexible rotatable magnetic disk.

42. A method for treating with a fluid a rotatable magnetic information storing disk disposed in an envelope, said envelope being provided with a central opening through which a means for rotating the disk may be engaged with the disk and an access opening through which a magnetic head may be inserted for reading or writing information on the disk, comprising:
engaging the envelope with a means to prevent the envelope from rotating while the disk is rotating;
providing fluid for treating the disk to a pad engagable with said disk through said access opening;
rotating the disk; and
engaging the pad with the disk through the access opening.

43. A system for treating a floppy disk disposed in an envelope with fluid, said system comprising:
a first fluid absorbing pad;
means for moving said first fluid absorbing pad into and out of contact with a first magnetic information storing surface of said disk through a read-write opening in the envelope;
fluid dispensing means for providing fluid to said first fluid absorbing pad; and
means for rotating said floppy disk about its center, said envelope remaining stationary while said floppy disk is rotating, so that said first magnetic information storing surface is treated with said fluid by means of contact of said surface with said first pad to which fluid is dispensed.

44. A system as in claim 43 wherein said fluid is a cleaning fluid.

45. A system as in claim 43 wherein said fluid contains lubricant.

46. A system for treating a floppy disk disposed in an envelope with fluid comprising:
a first fluid absorbing pad;
a first pivotable plate on which said first fluid absorbing pad is mounted;
a means of pivoting said first pivotable plate so that said first fluid absorbing pad is placed into and out of contact with a first magnetic information storing surface of said disk through a read-write opening in the envelope;
fluid dispensing means for providing fluid to said fluid absorbing pad; and
means for rotating said floppy disk about its center, said envelope remaining stationary while said floppy disk is rotating, so that said first magnetic information storing surface is treated with said fluid by means of contact of said surface with said first pad to which fluid is dispensed.

47. A system as in claim 46 wherein said fluid is a fluid for cleaning said floppy disk.

48. A system as in claim 46 wherein said fluid contains lubricant.

49. A system as in claim 46 further comprising:
a second fluid absorbing pad;
a second pivotable plate on which said second fluid absorbing pad is mounted; and
means for pivoting said second pivotable plate so that said second fluid absorbing pad is moved into and out of contact opposite said first fluid absorbing pad with a second magnetic information storing surface of said disk through a read-write opening in the envelope; and wherein said fluid dispensing means provides fluid to said second fluid absorbing pad in addition to said first fluid absorbing pad, whereby said first and said second magnetic information storing surfaces are simultaneously treated with fluid while said disk is rotating by means of contact of said first and second surfaces with, respectively, said first and second pads to which fluid has been dispensed.

50. A method for treating with a fluid a flexible, rotatable magnetic disk disposed in a jacket having a read-write opening therethrough for insertion of a magnetic head for reading or writing on said disk, said method comprising the steps of:

engaging the jacket in a vertical orientation with a means to prevent the jacket from rotating while the disk is rotating;

applying fluid to a pad movable into and out of contact with the disk through the read-write opening;

permitting excess fluid provided to said pad to drip therefrom;

rotating said disk; and moving the pad into contact with the disk through the read-write opening after said excess fluid has been permitted to drip from the pad.

51. An apparatus for treating with a fluid a floppy disk having a central opening and disposed in an envelope provided with openings for read/write heads comprising:

means for securing the envelope of the floppy disk so that the disk can be rotated above its axis within the envelope with the envelope remaining stationary;

means for rotating the floppy disk;

at least one pad capable of containing fluid for treating a floppy disk surface; and pad disposing means for placing said at lease one pad into contact with a floppy disk through an opening for a read/write head in the envelope, said pad disposing means coupled to said means for rotating so that said pad is in contact with the floppy disk only while said disk is rotating.

52. An apparatus as in claim 51 wherein said means for rotating comprises:

an electric motor having a spindle located along the disk axis;

a member mounted concentrically on said spindle to rotate with said spindle having an annular surface normal to the disk axis and facing the disk, said annual surface sized to contact the disk in the region adjacent to its central opening;

a second member having an annular surface concentric with and normal to the disk axis and facing the second surface of the disk, said annular surface sized to contact the disk in the region adjacent to the disk's central opening; and means for moving said first and second member relative to one another so that said annular surfaces on said first and second members are placed into contact with and grasp said disk.

* * * * *